R. HOSKIN.
PIPE COUPLING.
No. 105,456.                      Patented July 19, 1870.
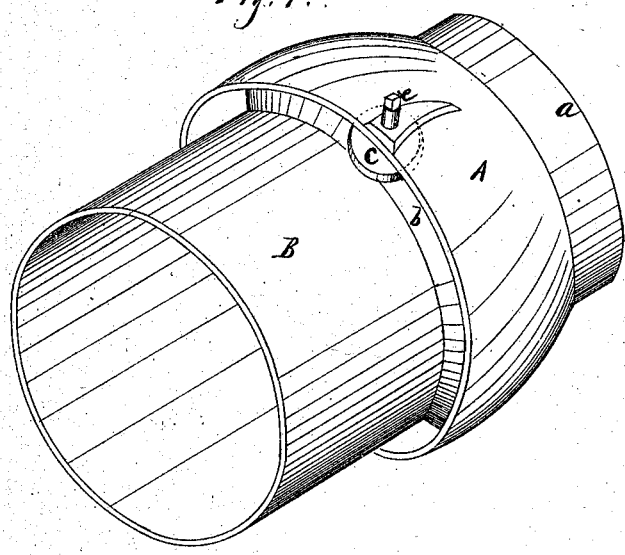
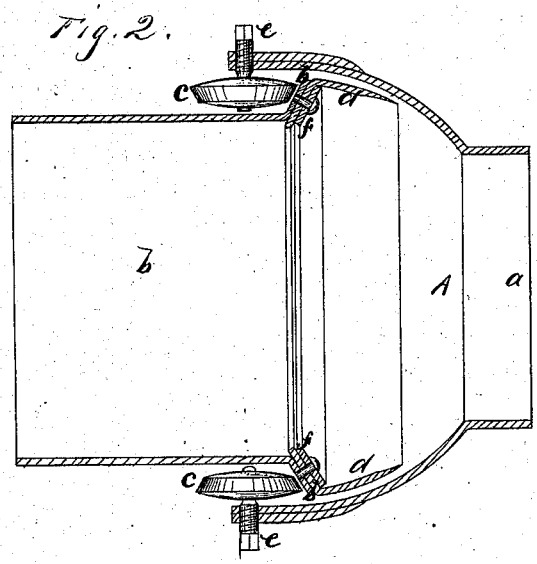
Witnesses
Wm R Bone
Geo. H. Strong.
Inventor
Richard Hoskin
by his Atty's
Dewey & Co

United States Patent Office.

RICHARD HOSKIN, OF DUTCH FLAT, CALIFORNIA.

Letters Patent No. 105,456, dated July 19, 1870.

IMPROVEMENT IN PIPE-COUPLINGS.

The Schedule referred to in these Letters Patent and making part of the same.

*To all whom it may concern:*

Be it known that I, RICHARD HOSKIN, of Dutch Flat, county of Placer, State of California, have invented an Improved Pipe-Joint; and I do hereby declare the following description and accompanying drawing are sufficient to enable any person skilled in the art or science to which it most nearly appertains, to make and use my said invention and improvements without further invention or experiment My invention relates to an improved movable joint for connecting the sections of pipes and tubing at those points where it is desired to vary the direction or line of the pipe, and is an improvement on the form known as the ball-and-socket joint.

My joint can also be used when employed in connection with a suitable nozzle as a means of directing streams of water in hydraulic mining.

In order to explain my invention so that others will be able to understand its construction and operation reference is had to the accompanying drawing forming a part of this specification, in which—

A represents a cup-shaped socket with curved sides, at one end of which a flange, *a*, is formed, to which one section of the pipe or tube to be connected is attached in any suitable manner.

The section B is simply a hollow tube or section of pipe, which may be made of the proper size to fit upon the pipes to be connected, or otherwise, as desired.

At one end of this section is formed a flange, *b*, which stands at right angles, or nearly so, to the sides of the pipe and extending outward from it.

This flange is made so that its outside rim will fit against the circular sides of the cup-socket A inside the socket.

A circular or other strip of leather, India rubber, or other flexible material, *d*, is then prepared and placed with its inside rim against the under side of the flange *b*, as shown, where it is confined by a ring, *f*, or other suitable device, which is riveted to the flange, the rivets also passing through the flexible material *d*.

This flexible material is then turned over the ring, so as to form an apron or packing-rim by fitting closely against the walls of the socket when there is a pressure of water in the pipe, and thus preventing any escape at the moving joint.

The end of the section B being thus prepared, it is inserted in the socket and confined therein by two small wheels or friction-rollers, *c*, which have convex sides, as shown.

These wheels are secured upon the inside of the socket, and opposite to each other, by pins, *e*.

A portion of each of the pins, near the head, is provided with threads, as shown, so as to allow of their being screwed into the rim of the socket while the portion which projects inside the cup serves as a journal for the wheels.

The section B will thus be allowed to move freely inside the socket from side to side, the friction-rollers relieving the pressure on the joint so as to permit it to be handled with great ease.

Having thus described my invention,

What I claim, and desire to secure by Letters Patent, is—

1. The section B, with its flange *b*, and flexible packing *d*, in combination with the socket A, substantially as and for the purpose above described.

2. The convex-sided wheels C, together with the pins *e*, constructed substantially as and for the purpose herein described.

In witness that the above-described invention is claimed by me I have hereunto set my hand and seal.

RICHARD HOSKIN. [L. S.]

Witnesses:
EDWARD THOMAS,
JAMES T. STAPLES.